United States Patent [19]

Crounse

[11] 4,448,722

[45] May 15, 1984

[54] PHTHALOCYANINES

[75] Inventor: Nathan N. Crounse, Myrtle Beach, S.C.

[73] Assignee: The Hilton-Davis Chemical Co., Cincinnati, Ohio

[21] Appl. No.: 423,932

[22] Filed: Sep. 27, 1982

Related U.S. Application Data

[60] Division of Ser. No. 235,969, Feb. 19, 1981, Pat. No. 4,379,710, Continuation-in-part of Ser. No. 44,238, May 31, 1979, abandoned.

[51] Int. Cl.³ .............................................. C09B 47/04
[52] U.S. Cl. ............................... 260/245.1; 260/245.8; 260/245.9
[58] Field of Search .............. 260/245.1, 245.8, 245.78

[56] References Cited

U.S. PATENT DOCUMENTS

| | | | |
|---|---|---|---|
| 2,863,875 | 12/1958 | Bienert et al. | 260/314.5 |
| 3,053,849 | 12/1962 | Clark et al. | 260/314.5 |
| 3,057,873 | 10/1962 | Pugin et al. | 260/314.5 |
| 3,660,386 | 5/1972 | Benz et al. | 260/245.78 |
| 3,954,392 | 5/1976 | Dien | 260/245.8 X |
| 4,036,585 | 7/1977 | James et al. | 8/1 XA |
| 4,069,064 | 1/1978 | Nett et al. | 106/193 P |
| 4,081,239 | 3/1978 | Jefferies | 260/245.78 |
| 4,111,650 | 9/1978 | Lacroix et al. | 8/85 |
| 4,280,956 | 7/1981 | Schreiner et al. | 260/245.78 X |

FOREIGN PATENT DOCUMENTS

| | | |
|---|---|---|
| 2301479 | 7/1973 | Fed. Rep. of Germany . |
| 2629675 | 1/1977 | Fed. Rep. of Germany . |

OTHER PUBLICATIONS

Houben–Weyl, Methoden der Organischen Chemie, vol. 11/1, (1957), Georg Thieme Verlag, Stuttgart, Germany, P. 675.

McOmie, Protective Groups in Organic Chemistry, Plenum Press, New York (1973), pp. 44–49.

*Primary Examiner*—Richard Raymond
*Attorney, Agent, or Firm*—Terrence E. Miesle; Paul E. Dupont; B. Woodrow Wyatt

[57] ABSTRACT

Storage-stable aqueous compositions containing dissolved water-soluble novel acid addition salts of poly(N-substituted sulfonamido) phthalocyanines which are prepared by the interaction of a single acid or a mixture of acids and poly(N-substituted sulfonamido) phthalocyanines, are useful for direct dyeing, particularly the dyeing of cellulose.

10 Claims, No Drawings

PHTHALOCYANINES

CROSS REFERENCE TO RELATED APPLICATIONS

This application is a division of my co-pending application Ser. No. 235,969, filed Feb. 19, 1981, now U.S. Pat. No. 4,379,710, in turn a continuation-in-part of my prior co-pending application Ser. No. 044,238, filed May 31, 1979, now abandoned.

BACKGROUND OF THE INVENTION (a) Field of the Invention

This invention relates to the field of chemistry and more particularly to novel acid addition salts of poly(N-substituted sulfonamido) phthalocyanines useful as direct dyes, particularly in the dyeing of cellulose; to storage-stable concentrated aqueous dye compositions prepared therefrom; and to processes for preparing said phthalocyanines, said acid addition salts and said storage-stable concentrated aqueous dye solutions.

(b) Description of the Prior Art

A class of organic compounds known as direct dyes are known to be useful as dyeing agents for paper and fabrics. Among this group of organic compounds there are named phthalocyanines and their acid addition salts. However, heretofore known phthalocyanines and their known acid addition salts have suffered from a number of deficiencies when employed as dyes for coloring cellulose in the form of bleached pulp of the type used for the manufacture of household paper goods such as paper napkins, paper toweling, facial tissues and so forth. Thus, they have been found to undesirably bleed out of paper products colored with them when the article is brought into contact with common household solutions, for example, water, milk, soapy solutions, detergent solutions, alcoholic beverages, vinegar, rubbing alcohol and so forth. They have also been found to have relatively poor substantivity to bleached pulp and have suffered from a low rate and degree of exhaust from dyeing solutions containing them. They have also been found to have a relatively poor degree of color discharge when bleached with hypochlorite or "chlorine" bleach. There is thus a need for water-soluble phthalocyanine dyestuffs for coloring bleached pulp which have a high bleed resistance, good substantivity, a high rate and a high degree of exhaust from aqueous dyeing solutions in which they are utilized, and a high degree of color discharge when bleached with hypochlorite or "chlorine" bleach.

The following items to date appear to constitute the most relevant prior art with regard to the instant invention.

U.S. Pat. No. 4,069,064 (issued Jan. 17, 1978) discloses a phthalocyanine formulation which is stabilized against recrystallization and change of modification and which contains as the stabilizer a salt or the corresponding homogeneous mixture, of ($\alpha$) one or more phthalocyanine derivatives of the formula Pc[—X—NR$^1$R$^2$]n, where Pc is an n-valent radical of the metal-free phthalocyanine, of a copper phthalocyanine or of a mixture of these, X is —CH$_2$—,SO$_2$—NR—alk—, —CH$_2$—COO—C$_2$H$_4$— or —CH$_2$—CH$_2$—COO—C$_3$H$_6$—, R$^1$ is hydrogen, alkyl of 1 to 20 carbon atoms, phenyl, phenyl which is substituted by methyl, methoxy, ethoxy or chlorine, —(C$_2$H$_4$—NH)$_z$H or —(C$_3$H$_6$—NH)$_z$H, R$^2$ is hydrogen, alkyl of 1 to 6 carbon atoms or cycloalkyl of 6 to 8 carbon atoms, alk is linear or branched saturated alkylene of 2 to 6 carbon atoms, R is hydrogen or alkyl of 1 to 4 carbon atoms, and R and R$^2$ may be linked to one another, n is a number from 2 to 5, z is an integer from 1 to 3 and the group —NR$^1$R$^2$ may also be a heterocyclic ring selected from the group consisting of morpholinyl, thiomorpholinyl, piperazinyl, N-methylpiperazinyl, N-ethylpiperazinyl, piperidinyl, pyrrolidinyl and

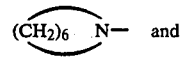

($\beta$) a saturated or unsaturated aliphatic sulfonic acid of 8 to 20 carbon atoms, a benzenesulfonic or naphthalenesulfonic acid, substituted by one or two alkyl groups each of 6 to 20 carbon atoms, and in which the benzene or naphthalene nucleus can be substituted by a hydroxyl group, or mixtures thereof, the molar ratio of ($\alpha$): ($\beta$) being from 1:1 to 1:5, and the said salt or corresponding mixture acting as a stabilizer in the formulation.

U.S. Pat. No. 2,863,875 (issued Dec. 9, 1958) discloses a phthalocyanine dyestuff containing the group [—SO$_2$N(R$_1$)R$_2$(NR$_3$R$_4$)]$_n$ wherein R$_1$ is a hydrogen or a lower alkyl, R$_2$ is a lower alkylene, R$_3$ and R$_4$ are lower alkyl or hydroxy lower alkyl and n is one to eight.

U.S. Pat. No. 4,036,585 (issued July 17, 1977) discloses a copper phthalocyanine dyestuff bearing the groups [—SO$_2$NHCH$_2$CH$_2$NHCH$_2$CH$_2$CN]$_n$ wherein n is 3 to 4.

U.S. Pat. No. 3,053,849 (issued Sept. 11, 1962) discloses phthalocyanine dyestuffs of the formula

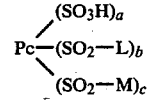

wherein Pc is a phthalocyanine; L is [—NH(CHR$_3$CH$_2$Y)$_m$—CHR$_4$CHR$_5$X]; R$_3$, R$_4$ and R$_5$ are hydrogen or alkyl; Y is —NH—, —N—lower alkylene, —O— or —S—; m is 0 or 1; X is Cl, Br, sulfo or sulfonyloxy; M is amino or substituted amino; a is 0-2; b is 1-3; and C is 1-3 provided that the sum of a+b+c does not exceed four.

U.S. Pat. No. 3,057,873 (issued Oct. 9, 1962) discloses phthalocyanine dyestuffs of the formula [(X$_1$SO$_2$)$_m$—Pc—(SO$_3^\ominus$)$_n$][X$_2^\oplus$]$_n$ wherein Pc is a phthalocyanine radical; X$_1$ is a polyalkylene polyamine containing at least one lipophilic radical and at least three basic nitrogen atoms; X$_2$ is the ammonium cation of such a polyalkylene polyamine; and m+n is 2 to 4.

German Offenlegenschrift No. 2,629,675 (published Jan. 20, 1977), which corresponds to U.S. Pat. No. 4,111,650 (issued Sept. 5, 1978), discloses a stable concentrated liquid preparation of a paper dye of the copper phthalocyanine class which preparation contains 15 to 50 percent by weight of the dye of the formula CuPc[SO$_2$NH(CH$_2$)$_3$N(CH$_2$)$_3$]$_2$ to 3 [SO$_3$H]$_1$ to 2 wherein CuPc represents copper phthalocyanine, or the alkali salt thereof, dissolved in 30 to 65 percent by weight of water, 5 to 15 percent by weight of N-methylpyrrolidone, 1 to 7 percent water by weight of benzyl alcohol, and 1 to 5 percent by weight of a lower aliphatic carboxylic acid.

SUMMARY OF THE INVENTION

In one of its composition of matter aspects, the invention relates to storage-stable dye compositions comprising aqueous solutions of acid addition salts of poly(N-substituted sulfonamido) copper phthalocyanines.

In a second composition of matter aspect, the invention relates to acid addition salts of poly(N-substituted sulfonamido) copper phthalocyanines.

In a third composition of matter aspect, the invention relates to poly{N-[2-(2-oxo-imidazolidin-1-yl)ethyl]sulfonamido}copper phthalocyanines.

In a fourth composition of matter aspect, the invention relates to poly{N-[N-(2-aminoethyl)-2-aminoethyl]sulfonamido}copper phthalocyanines.

In a fifth composition of matter aspect, the invention relates to poly[N-(3-aminopropyl)sulfonamido]copper phthalocyanines.

In one of its process aspects, the invention relates to a process for preparing a storage-stable aqueous dye solution which comprises interacting a single acid or a mixture of acids with poly(N-substituted sulfonamido)-copper phthalocyanines in a mixture of a glycol or urea and water.

In a second process aspect, the invention relates to a process for preparing acid addition salts of poly(N-substituted sulfonamido) copper phthalocyanines which comprises interacting a single acid or a mixture of acids with poly(N-substituted sulfonamido)copper phthalocyanines.

In a third process aspect, the invention relates to a process for preparing poly{N-[2-(2-oxo-imidazolidin-1-yl)ethyl]sulfonamido}copper phthalocyanines which comprises interacting poly(chlorosulfonyl) copper phthalocyanines with an excess of 1-(2-aminoethyl)-2-imidazolidinone.

In a fourth process aspect, the invention relates to a process for preparing poly{N-[N-(2-aminoethyl)-2-aminoethyl]sulfonamido}copper phthalocyanines which comprises hydrolyzing poly{N-[2-(2-oxo-imidazolidin-1-yl)ethyl]sulfonamido}copper phthalocyanines in a strong acidic medium and then rendering the resulting mixture alkaline to obtain poly N-[N'-(2-aminoethyl)-2-aminoethyl]sulfonamido copper phthalocyanines.

In a fifth process aspect, the invention relates to a process for preparing poly[N-(3-aminopropyl)sulfonamido]copper phthalocyanines which comprises interacting poly(chlorosulfonyl)copper phthalocyanines with an excess of N-acetylpropylenediamine, hydrolyzing the resulting poly[N-(3-acetylaminopropyl)sulfonamido]copper phthalocyanines in an acid medium and rendering the resulting mixture alkaline to obtain poly[N-(3-aminopropyl)sulfonamido]copper phthalocyanines.

DETAILED DESCRIPTION INCLUSIVE OF THE PREFERRED EMBODIMENTS

More specifically, this invention in the first of its composition of matter aspects resides in novel storage-stable dye compositions comprising concentrated, free-flowing aqueous solutions containing by weight of the entire composition: (a) as the dye constituent approximately 9 to approximately 40 percent of acid addition salts of a phthalocyanine of the formula

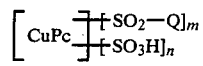

Formula I with a single acid or mixed acids wherein: Pc is phthalocyanine, Q is selected from the group consisting of $-NH(CH_2)_yN(R)_2$, and $-NH(CH_2)_yNH(CH_2)_yNH_2$ in which R is selected from the group consisting of hydrogen, $C_1$ to $C_4$ alkyl and $C_1$ to $C_4$ hydroxyalkyl and y is a number from two to four, m is a number from one to five, and n is a number from zero to one; (b) from zero to approximately 10 percent of a $C_1$ to $C_3$ alkanesulfonic acid; (c) approximately 5 to approximately 30 percent of an aliphatic or hydroxyaliphatic carboxylic acid, or in an inorganic acid; (d) approximately 5 to approximately 25 percent of urea or a glycol selected from the group consisting of ethylene glycol, propylene glycol, diethylene glycol and diethylene glycol monoethyl ether; and (e) the remainer being water.

In a first particular embodiment in accordance with the first of its composition of matter aspects, the invention sought to be patented resides in the novel storage-stable dye compositions containing as the dye constituent acid addition salts of a phthalocyanine according to Formula I wherein Q is $-NH(CH_2)_yN(R)_2$ having the formula

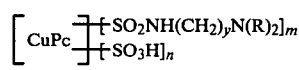

Formula II with a single acid or mixed acids wherein: Pc, R, m, n, and y each have the same respective meanings given in Formula I. Preferred storage-stable dye compositions within the ambit of this particular embodiment are: (a) a composition containing by weight of the entire composition approximately 7 to approximately 12 percent of a dye constituent of Formula II wherein R is hydrogen, y is three, and m is two to three, approximately 1 to approximately 3 percent of methanesulfonic acid, approximately 7 to approximately 12 percent of acetic acid, approximately 3 to approximately 8 percent of ethylene glycol and approximately 82 to approximately 65 percent of water; (b) a composition containing by weight of the entire composition approximately 20 to approximately 25 percent of a dye constituent of Formula II wherein R is methyl, y is three and m is two to three, approximately 2 to approximately 8 percent methanesulfonic acid, approximately 20 to approximately 25 percent acetic acid, approximately 8 to approximately 14 percent ethylene glycol and approximately 50 to approximately 28 percent percent water; (c) a composition containing by weight of the entire composition approximately 26 to approximately 32 percent of a dye constituent of Formula II wherein R is methyl, y is three, and m is two to three, approximately 17 to approximately 25 percent of acetic acid, approximately 8 to approximately 14 percent of ethylene glycol, and approximately 49 to approximately 29 percent of water; and (d) a composition containing by weight of the entire composition approximately 26 to approximately 32 percent of a dye constituent of Formula II wherein R is methyl, y is three, and m is two to three, approximately 5 to approximately 10 percent of glycolic acid, approximately 20 to approximately 26 percent of urea, and approximately 49 to approximately 68 percent of water.

In a second particular embodiment in accordance with the first of its composition of matter aspect, the invention sought to be patented resides in the novel storage-stable dye compositions containing as the dye constituent acid addition salts of a phthalocyanine according to Formula I wherein Q is —NH(CH$_2$)$_y$—NH(CH$_2$)$_y$NH$_2$ having the formula

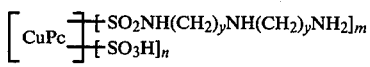  Formula III with a single acid or mixed acids wherein: Pc, m, n, and y each have the same respective meanings given in Formula I. Preferred storage-stable dye compositions within the ambit of this particular embodiment are: (a) a composition containing by weight of the entire composition approximately 19 to approximately 24 percent of a dye constituent of Formula III wherein y is two and m is two to three, approximately 21 to approximately 26 percent of acetic acid, approximately 2 to approximately 7 percent of methanesulfonic acid, approximately 9 to approximately 15 percent of ethylene glycol, and approximately 49 to approximately 28 percent of water; (b) a composition containing by weight of the entire composition approximately 15 to approximately 21 percent of a dye constituent of Formula III wherein y is two and m is two to three, approximately 23 to approximately 29 percent of glycolic acid, approximately 1 to approximately 6 percent of methanesulfonic acid, approximately 6 to approximately 12 percent of ethylene glycol, and approximately 55 to approximately 32 percent of water; (c) a composition containing by weight of the entire composition approximately 15 to approximately 21 percent of a dye constituent of Formula III wherein y is two, and m is two to three, approximately 23 to approximately 29 percent of glycolic acid, approximately 1 to approximately 6 percent of methanesulfonic acid, approximately 6 to approximately 12 percent of propylene glycol, and approximately 55 to approximately 32 percent of water; and (d) a composition containing by weight of the entire composition approximately 15 to approximately 21 percent of a dye constituent of Formula III wherein y is two, and m is two to three, approximately 23 to approximately 29 percent of glycolic acid, approximately 1 to approximately 6 percent of methanesulfonic acid, approximately 6 to approximately 12 percent of diethylene glycol monoethyl ether, and approximately 55 to approximately 32 percent of water.

In a second composition of matter aspect, the invention sought to be patented resides in the novel acid addition salts of a phthalocyanine of the formula

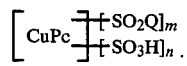  Formula I with a single acid or mixed acids wherein: Pc is phthalocyanine; Q is selected from the group consisting of —NH(CH$_2$)$_y$N(R)$_2$ and —NH(CH$_2$)$_y$NH(CH$_2$)$_y$NH$_2$ in which R is selected from the group consisting of hydrogen, C$_1$ to C$_4$ alkyl and C$_1$ to C$_4$ hydroxyalkyl and y is a number from two to four; m is a number from one to five; and n is a number from zero to one having a total of at least (0.5 m) but not more than (2 m) complexed molecules of one or more acids selected from the group consisting of hydrochloric acid, hydrobromic acid, acetic acid, propionic acid, glycolic acid, 3-hydroxypropionic acid, lactic acid, methanesulfonic acid, and ethanesulfonic acid.

In a first particular embodiment in accordance with the second of its composition of matter aspect, the invention sought to be patented resides in the novel acid addition salts of a phthalocyanine according to Formula I wherein Q is —NH(CH$_2$)$_y$N(R)$_2$ having the formula

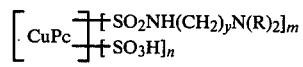  Formula II with a single acid or mixed acids wherein: Pc, R, m, n, and y each have the same respective meanings given in Formula I. Preferred acid addition salts of phthalocyanines of Formula II falling within the ambit of this particular embodiment are: (a) wherein R is hydrogen, y is three and m is two to three having one to two complexed glycolic acid molecules and 0.5 to one sulfonic acid substituent and having 0.5 to 1.5 complexed methanesulfonic acid molecules, one to two complexed acetic acid molecules and 0.5 to one sulfonic acid substituent; (b) wherein R is methyl, y is three and m is one to three having 0.5 to two complexed methanesulfonic acid molecules and 0.5 to one sulfonic acid substituent and having two to three complexed glycolic acid molecules and 0.3 to 0.8 sulfonic acid substituent; and (c) wherein R is hydroxyethyl, y is three and m is one to three having one to two complexed methanesulfonic acid molecules and 0.5 to one sulfonic acid substituent.

In a second particular embodiment in accordance with the second of its composition of matter aspects, the invention sought to be patented resides in the novel acid addition salts of a phthalocyanine according to Formula I wherein Q is —NH(CH$_2$)$_y$—NH(CH$_2$)$_y$NH$_2$ having the formula

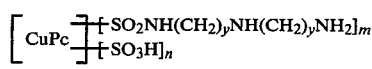  Formula III with a single acid or mixed acids wherein Pc, m, n, and y each have the same respective meanings given in Formula I. Particularly preferred acid addition sales of phthalocyanine of Formula III falling within the ambit of this particular embodiment are those wherein y is two and m is one to three having one to three complexed hydrochloric acid molecules and 0.5 to one sulfonic acid substituent; having three to five complexed hydrochloric acid molecules and 0.5 to one sulfonic acid substituent; having 0.5 to two complexed acetic acid molecules and 0.5 to one sulfonic acid substituent; having one to three complexed glycolic acid molecules and 0.5 to one sulfonic acid substituent; having one to four complexed methanesulfonic acid molecules and 0.5 to one sulfonic acid substituent; and having one to three complexed methanesulfonic acid molecules, 0.5 to three complexed acetic acid molecules and 0.5 to one sulfonic acid substituents.

In a third composition of matter aspect, the invention sought to be patented resides in the novel phthalocyanines having the formula

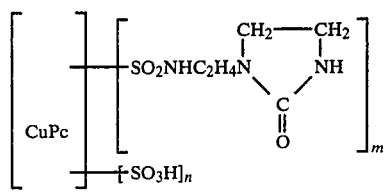

Formula IV wherein Pc is phthalocyanine, m is a number from one to five and n is a number from zero to one.

In a fourth composition of matter aspect, the invention sought to be patented resides in the novel phthalocyanines having the formula

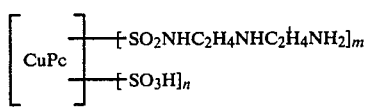

Formula V wherein m is a number from one to five and n is a number from zero to one.

In a fifth composition of matter aspect, the invention sought to be patented resides in the novel phthalocyanines having the formula

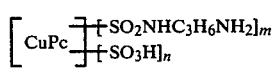

Formula VI wherein m is a number from one to five and n is a number from zero to one.

In one of its process aspects, the invention sought to be patented resides in a process for preparing storage-stable aqueous dye compositions containing acid addition salts of poly(N-substituted sulfonamido) copper phthalocyanines of Formula I which comprises interacting approximately 0.5 to approximately 10 molecular equivalents of a single acid or a mixture of acids with approximately one molecular equivalent of copper phthalocyanine having at least one and not more than five —$SO_2Q$ substituents and zero to one sulfonic acid substituent in a mixture of water, urea or a glycol chosen from the group consisting of ethylene glycol, propylene glycol, diethylene glycol and diethylene glycol monoethyl ether, a $C_1$ to $C_3$ alkanesulfonic acid, and an aliphatic or hydroxyaliphatic carboxylic acid or an inorganic acid, said components being used in appropriate quantities to produce by weight of the entire composition approximately 9 to approximately 40 percent of a dye constituent, approximately 5 to approximately 25 percent of urea or a glycol, zero to approximately 10 percent of an alkanesulfonic acid, approximately 5 to approximately 30 percent of an aliphatic or hydroxyaliphatic carboxylic acid or inorganic acid and the remainder being water.

In a second process aspect, the invention sought to be patented resides in a process for preparing acid addition salts of a poly(N-substituted sulfonamido) copper phthalocyanine of Formula I which comprises interacting approximately 0.5 to approximately 10 molecular equivalents of a single acid or a mixture of acids with approximately one molecular equivalent of copper phthalocyanine having at least one and not more than five —$SO_2Q$ substituents and zero to one sulfonic acid substituent.

In a third process aspect, the invention sought to be patented resides in the process for preparing a copper phthalocyanine having one to five N-[2-(2-oxo-imidazolidin-1-yl)ethyl]sulfonamido substituents and zero to one sulfonic acid substituent according to Formula IV which comprises interacting a copper phthalocyanine having one to six chlorosulfonyl substituents with an excess of 1-(2-aminoethyl)-2-imidazolidinone in the presence of an alkali metal carbonate and pyridine.

In a fourth process aspect, the invention sought to be patented resides in the process for preparing a copper phthalocyanine having one to five N-[N'-(2-aminoethyl)-2-aminoethyl]sulfonamido substituents and zero to one sulfonic acid substituent according to Formula V which comprises in a first step hydrolyzing a copper phthalocyanine having one to five N-[2-(2-oxo-imidazolidin-1-yl)ethyl]sulfonamido substituents and zero to one sulfonic acid substituent in a strong acidic medium and in a second step rendering the resulting mixture from the first step alkaline to obtain the copper phthalocyanine having one to five N-[N'-(2-aminoethyl)-2-aminoethyl]sulfonamido substituents and zero to one sulfonic acid substituent.

In a fifth process aspect, the invention sought to be patented resides in the process for preparing a copper phthalocyanine having one to five N-(3-aminopropyl)-sulfonamido substituents and zero to one sulfonic acid substituent according to Formula VI which comprises in the first step interacting a copper phthalocyanine having one to six chlorosulfonyl substituents with an excess of N-acetylpropylenediamine in the presence of an alkali metal carbonate and pyridine, and in a second step the resulting copper phthalocyanine having one to five N-(3-acetylaminopropyl)sulfonamido substituents and zero to one sulfonic acid substituent is hydrolized in an acid medium and in a third step the resulting mixture is rendered alkaline to obtain the copper phthalocyanine having one to five N-(3-aminopropyl)sulfonamido substituents and zero to one sulfonic acid substituent.

The term "phthalocyanine" is used herein in the generic sense to mean the class of tetraazoporphins in which each of four pyrrole nuclei is fused to an aromatic nucleus, e.g. that of benzene. Phthalocyanine itself (tetrabenzotetraazoporphin) is a well-known example of the class, and the prefixed term "copper" means that the phthalocyanine contains a copper ion in complex combination.

The terms "complexed acid molecules", "complexed hydrochloric acid molecules", "complexed methanesulfonic acid molecules", "complexed acetic acid molecules" and "complexed glycolic acid molecules" are used herein to mean that the respective acid molecules are present in the dyestuff molecule in the form of acid addition adducts. It will, of course, be understood that the precise type of bonding will depend on the condition in which the dyestuff molecule exists, that is, as a discrete solid or dissolved in solution. Thus, in the former, it would be expected that the acidic materials would be bound by quaternization of primary, secondary and tertiary amino substituents of the aminoalkylenesulfonamido tail chains while in the latter, it would be expected although the aminoalkylenesulfonamido substituents would also by predominantly in the quaternized form, some dissociation is possible in such an "acid-base" system.

It is well known by those skilled in the art of phthalocyanine chemistry that synthetic processes for the chlorosulfonation of phthalocyanine molecules almost invariably produce mixtures of substituted products rather than a single product having a specific number of substituents. This is, of course, the case with the instant compounds. The methods of chlorosulfonation of the phthalocyanines are known and usually give mixture of chlorosulfonated products comprising, for example, bis-, tris- and tetrachlorosulfonates. The fact that mixtures are obtained and not a single compound is not in any way deleterious to the use of the products as dyestuffs. The procedures taught in U.S. Pat. No. 2,863,875 which have been followed to produce the requisite metal phthalocyanine sulfonic acid chloride dyestuff intermediates herein, as would be expected have been found to produce mixtures of substituted phthalocyanine molecules. Accordingly, the terms like zero to one, one to three, one to five, and the like adopted in the claims and in the disclosure to describe the number of N-substituted sulfonamido and sulfonic acid substituents on the subject phthalocyanines as well as the number of complexed acid molecules means the average number of said substituents per molecule of phthalocyanine. The meaning of these terms may be illustrated with reference to the amount or number of sulfonic acid substituents which are introduced into the phthalocyanine compounds as a result of hydrolysis of the sulfonic acid chloride portion of the molecule both during isolation from its reaction mass and during the interaction of the sulfonic acid chloride with an appropriate amine in an aqueous medium to obtain the desired phthalocyanine sulfonamido derivative. It is obvious that there cannot be 0.5 of a sulfonic acid substituent on the phthalocyanine molecule. This figure is, of course, an average value which results from the presence in the mixture of phthalocyanine molecules having either zero or one sulfonic acid substituent.

The instant novel acid addition salt forms of the poly(N-substituted sulfonamido) copper phthalocyanine dyestuffs provide shades of turquoise. They have valuable properties as water-soluble direct dyes useful in the dyeing art for coloring natural fibers, synthetic fiber-forming materials and cellulose materials such as threads, sheets, filaments, textile fabrics and the like as well as in the manufacture of paper, varnishes, inks, coatings and plastics. Further the free base forms of the poly(N-substituted sulfonamido) copper phthalocyanines including the poly N-[2-(2-oxo-imidazolidin-1-yl)ethyl] sulfonamido derivative are useful as pigments and as pigment additives.

The mixtures of poly(N-substituted sulfonamido) copper phthalocyanines and the water-soluble acid addition salts thereof of this invention are characterized by good lightfastness. The mixtures of the phthalocyanines in the form of their water-soluble acid addition salts are useful as dyes for dyeing operations, and in the water-insoluble free-base form as well as their acid addition salt forms as pigments for printing operations on woven and non-woven substrates made from natural fibers, such as wool, cellulose or linen, those made from semi-synthetic fibers, such as regenerated cellulose as represented by rayon or viscose, or those made from synthetic fibers, such as polyaddition, polycondensation or polymerization compounds. Such dyeings or printings can be carried out in accordance with the usual dyeing and printing processes.

The mixtures of the poly(N-substituted sulfonamido) copper phthalocyanines and their acid addition salt forms of this invention are also suitable for surface coloring or printing paper products and cardboard as well as for coloring paper pulps. Moreover, they are useful for incorporation into lacquers and films of various constitution, for example, those made from cellulose acetate, cellulose propionate, polyvinyl chloride, polyethylene, polypropylene, polyamides, polyesters of alkyd resins. In addition, the subject compounds are suitable for coloring natural or synthetic resins, for example, acrylic resins, epoxy resins, polyester resins, vinyl resins, polystyrene resins, or alkyd resins.

The mixtures of poly(N-substituted sulfonamido) copper phthalocyanines are readily converted to the corresponding watersoluble dyes by treatment in an aqueous solution containing from 0.5 to 10 equivalents of one or more of an inorganic acid, aliphatic or hydroxyaliphatic carboxylic acid and alkanesulfonic acid selected from the group consisting of hydrochloric, hydrobromic, acetic, propionic, glycolic, 3-hydroxypropionic, lactic, methanesulfonic and ethanesulfonic acids.

The mixtures of the acid addition salt forms can be isolated from the aqueous solution in which they are formed by techniques well known in the art, for example, by salting out, precipitation or concentration by evaporation. However, the mixtures of water-soluble dyes thus formed are readily utilized in the form of aqueous solutions for many of their applications, especially for dyeing cellulose. Accordingly, it is particularly preferred to retain the mixtures of dyes in a concentrated aqueous solution of the type regularly employed in the paper industry for dyeing paper products.

The acid addition salt forms are especially valuable dyes for imparting stable turquoise blue shades to paper both sized and unsized. For use in the paper trade, the mixtures of the acid addition salt forms of this invention have several outstanding advantages. Their high degree of water-solubility makes them particularly suitable for the preparation of liquid dye concentrates which are preferred in the paper industry. The use of concentrated aqueous solutions is particularly advantageous in view of the increasing trend toward automation, since these solutions are conveniently handled and added to the pulp slurry in accurately measured amounts by means of pump and meters. The subject aqueous dye concentrates are particularly suited to metered dyeing operations because they have low viscosity which remains essentially unchanged over long periods under ordinary storage conditions. Their low viscosity provides another advantage in that they dissolve readily in the pulp slurry and prevent specking or blotching seen when more viscous dye concentrates are used. A further advantage of the concentrated aqueous solutions is that of convenience in shipping and handling. In shipping and in use, the high degree of solubility of the acid addition salt forms permit handling of solutions containing a higher dye content and results in a desirable decrease in the weight and volume of solution per amount of dye. Furthermore, the concentrated aqueous dye solutions are more convenient for the paper mills in that the handling of dry dye, with the concomitant dusting and caking problems associated with dissolving the dye prior to its addition to the pulp slurry are eliminated.

The subject dyes constituting the mixtures of my invention are also less prone to "bleed" when paper impregnated therewith is wet and placed in contact with moist white paper. This is a particularly desirable property for dyes designed for coloring paper to be used in facial tissues, napkins, paper towels and the like wherein it can be foreseen that the colored paper, wetted with common household liquids such as water, soap and detergent solutions, milk, carbonated and alcoholic beverages, vinegar, rubbing alcohol, and so forth, may come in contact with other surfaces, such as textiles, paper and the like which should be protected from stain. Another advantageous property of these new mixtures of water-soluble dyes for use in the paper trade is found in their high degree of color discharge when bleached with hypochlorite or "chlorine" bleach. This property of the mixtures of the acid addition salt forms is particularly desired by papermakers in order that dyed paper may be completely bleached prior to reprocessing. Still another advantageous property of the mixtures of water-soluble dyestuffs of this invention is found in their high resistance to a change of shade when used to color cellulosic materials, which have either previously been treated with or are treated subsequent to dyeings, with wet-strength resin.

I have also found that the dyes of this invention have a high degree of substantivity for bleached fiber such as is used in most colored disposable paper products. Moreover, they are absorbed by cellulosic fibers from aqueous solution at a very rapid rate. These properties are advantageous to the paper industry, because it allows the dye to be added to the pulp just prior to formation of the sheet.

The best mode contemplated by the inventor of carrying out this invention will now be described as to enable any person skilled in the art to which it pertains to make and use the same.

In accordance with one of the process aspects of this invention, acid addition salt forms of the poly(N-substituted sulfonamido) copper phthalocyanines of Formula I are obtained by interacting approximately 0.5 to approximately 10 molecular equivalents of an organic or inorganic acid or a combination of organic and inorganic acids, for example, methanesulfonic acid, acetic acid, glycolic acid, and hydrochloric acid with approximately one molecular equivalent of copper phthalocyanine bearing at least one but not more than five $-SO_2Q$ substituents and from zero to one sulfonic acid substituent wherein Q has the meaning given in Formula I. The reaction is conveniently carried out in an aqueous medium at a temperature in the range of 15° C. to 80° C. The acid addition salt forms are readily isolated by various conventional means, for example, by evaporation of the solvent, by salting-out or more preferably by the addition of a miscible non-solvent, for example, a short chain aliphatic alcohol or a low molecular weight ketone.

Alternatively, the acid addition salt forms of poly(N-substituted sulfonamido) copper phthalocyanines can be obtained from storage-stable compositions containing them by salting-out techniques or by the addition of a miscible non-solvent, for example, a short chain aliphatic alcohol or a low molecular weight ketone.

In accordance with a further process aspect of the present invention, the storage-stable dye compositions containing acid addition salt forms of poly(N-substituted sulfonamido) copper phthalocyanines of Formula I are obtained by interacting an organic or inorganic acid or a combination of organic and inorganic acid with a copper phthalocyanine bearing at least one but not more than five $-SO_2Q$ substituents wherein Q has the same meaning given in Formula I and zero to one sulfonic acid substituent in a mixture of water and urea or a glycol, for example, ethylene glycol or propylene glycol. The reaction is conveniently carried out at a temperature in the range of 15° C. to 50° C. with the preferred temperature being ambient temperature. The said components are used in appropriate quantities to produce by weight of the entire composition approximately nine to approximately forty percent of a dye constituent, approximately five to approximately twenty-five percent of urea of a glycol, zero to approximately ten percent of an alkanesulfonic acid, approximately five to approximately thirty percent of an aliphatic or hydroxyaliphatic carboxylic acid or an inorganic acid and the remainder being water.

The requisite poly(N-substituted sulfonamido) copper phthalocyanines for the preparation of the acid addition salts of Formula I are prepared by first chlorosufonating a copper phthalocyanine. The chlorosulfonated copper phthalocyanines are readily obtained by the procedure similar to that taught in U.S. Pat. No. 2,863,875. Thus, copper phthalocyanine is interacted with chlorosulfonic acid and thionyl chloride in the proper ratios depending on the amount of chlorosulfonic acid substitution desired. The reaction is conveniently carried out in excess chlorosulfonic acid. The reaction mixture is then poured onto ice to obtain the desired poly(chlorosulfonated) copper phthalocyanine.

In accordance with a third process aspect of the invention, the compounds represented by Formula II wherein R is hydrogen and y is three, are conveniently prepared by interacting a poly(chlorosulfonated) copper phthalocyanine with an excess of N-acetyl-1,3-propylene diamine in the presence of an alkaline carbonate, for example, potassium carbonate and an organic base, for example, pyridine. The reaction is advantageously carried out in an aqueous medium at a temperature in the range of 15° C. to 75° C. The intermediate poly N-(N'-acetylaminopropylsulfonamido) copper phthalocyanine is isolated by filtration. The poly N-(N'-acetylaminopropylsulfonamido) copper phthalocyanine is then hydrolyzed in aqueous dilute mineral acid at the reflux temperature, that is, a temperature in the range of 95° to 105° C. The desired products of Formula VI are isolated by rendering the solution from the hydrolysis slightly alkaline with concentrated aqueous ammonia.

The compounds represented by Formula II wherein R is $C_1$ to $C_4$ alkyl are conveniently prepared by interacting a poly(chlorosulfonated) copper phthalocyanine with an excess of N,N-dialkylalkylenediamine, for example, dimethylaminopropylamine in the presence of an alkaline carbonate, for example, sodium carbonate and an organic base, for example, pyridine. The reaction is conveniently carried out in an aqueous medium at a temperature in the range of 15° to 85° C. The desired products of Formula II wherein R is $C_1$ to $C_4$ alkyl are conveniently isolated by filtration.

The compounds represented by Formula II wherein R is $C_1$ to $C_4$ hydroxyalkyl are conveniently prepared by interacting a poly(chlorosulfonated) copper phthalocyanine with an excess of N,N-dialkanolalkylenediamine, for example, diethanolaminopropylamine in the presence of an alkaline carbonate, for example, sodium carbonate and an organic base, for example, pyridine. The reaction is conveniently carried out in an aqueous medium at a temperature in the range of 15° to 90° C. The product is isolated by filtration.

In accordance with a still further process aspect of the invention, the compounds represented by Formula V are prepared by interacting a poly(chlorosulfonated) copper phthalocyanine with an excess of 1-(2-aminoethyl)imidazolidinone. The reaction is conveniently carried out in an aqueous medium in the presence of an alkaline carbonate, for example, potassium carbonate and an organic base, for example, pyridine at a temperature in the range of 20° to 75° C. After isolation, the resulting poly{N-[2-(2-oxoimidazolidin-1-yl)ethyl]sulfonamido}copper phthalocyanine of Formula IV is hydrolyzed in a dilute aqueous acid. The hydrolysis solution is then made slightly alkaline by the addition of aqueous ammonia and the poly{N-[N'-(2-aminoethyl)-2-aminoethyl]sulfonamido}copper phthalocyanines of Formula V are isolated.

The requisite 1-(2-aminoethyl)imidazolidinone intermediate is a known compound readily obtained by procedures taught in U.S. Pat. Nos. 2,613,212 and 2,868,727. Thus, one molecular equivalent of urea is interacted with one molecular equivalent of diethylene triamine liberating ammonia. The reaction can be carried out neat or in the presence of water which is distilled off during the course of the reaction. The reaction is conveniently carried out at a temperature over the range of 100° to 250° C. The 1-(2-aminoethyl)imidazolidinone can be used directly from the reaction or it can be distilled at reduced pressure before using.

The requisite N-acetyl-1,3-propylenediamine intermediate is a known compound readily obtained by procedures known in the art. In a first step, 2-methyl-1,4,5,6-tetrahydropyrimidine was prepared in a manner similar to that described in Japanese Patent No. 15,925 (1967)(Chemical Abstracts 68:39331n) by heating 1,3-propylenediamine and acetonitrile in the presence of sulfur. After cooling slightly, a small portion of elemental zinc was added to the reaction mixture and the 2-methyl-1,4,5,6-tetrahydropyrimidine was distilled at reduced pressure from the reaction mass. Finally, the 2-methyl-1,4,5,6-tetrahydropyrimidine was refluxed with water for two hours and cooled to obtain a solution of N-acetyl-1,3-propylenediamine.

The reactive amine intermediates required for interaction with poly(chlorosulfonyl) copper phthalocyanines to obtain the compounds of Formula II wherein R is $C_1$ to $C_4$ alkyl are known compounds whose preparation is well-known in the prior art. The following compounds are exemplary of these reactive amine compounds useful in the practice of this invention.

3-Dimethylaminopropylamine
3-Diethylaminopropylamine
3-Dibutylaminopropylamine
2-Dimethylaminoethylamine
2-Diethylaminoethylamine
2-Diisopropylaminoethylamine
4-Diethylaminobutylamine The reactive N-acetyl amine intermediates required for interaction with poly(chlorosulfonyl) copper phthalocyanines to obtain the compounds of Formula II wherein R is hydrogen after hydrolysis are prepared from diamines well known in the prior art by the process described above or by other procedures. The following compounds are exemplary of these reactive amine compounds useful in the practice of this invention.

Ethylenediamine
Propanediamine
Butanediamine

The following examples set forth the methods of preparation of the storage-stable dye compositions containing the acid addition salt forms of poly(N-substituted sulfonamido) copper phthalocyanines, acid addition salts of poly(N-substituted sulfonamido) copper phthalocyanines, and poly(N-substituted sulfonamido) copper phthalocyanines. All percentages of the constituents of the dye compositions given in the following examples are by weight. Included in the following examples are the results of the "bleed" tests as described in Example 1 of samples of paper prepared from pulp dyed with the products of the following examples. In these "bleed" tests the dyed sample of paper is wetted with the appropriate household liquid and placed as a filter between clean, dry, white filter paper. After a period of time the so-called "sandwich" is disassembled and the component piece mounted and dried. The filter papers are then examined under daylight and evaluated with respect to the amount of dye which bled from the dyed paper sample to the filter paper. The evaluations are graded on the basis of the following scale:

| Bleed Grade | Definition |
| --- | --- |
| none | no observable bleed |
| trace | first noticeable bleed |
| slight | approximately twice the trace amount of dye bleed |
| moderate | approximately four times the trace amount of dye bleed |
| appreciable | approximately eight times the trace amount of dye bleed |
| much | approximately sixteen times the trace amount of dye bleed |
| very much | approximately thirty-two times the trace amount of dye bleed |

EXAMPLE 1

A. Over approximately forty-five minutes, 80.0 g of copper phthalocyanine was gradually added to 336.0 ml of chlorosulfonic acid with stirring while maintaining 45° to 50° C. by means of an external cold water bath. While maintaining 45° to 50° C., 76.8 ml of thionyl chloride was slowly added to the mixture. After the addition, the reaction mixture was gradually heated to a gentle reflux at 88° C. and the reflux temperature slowly rose to 115° C. The reaction mixture was maintained at 115° to 120° C. for four hours and then cooled to ambient temperature to obtain a solution containing predominantly copper phthalocyanines trisulfonic acid chloride.

B. To a mixture of 200.0 ml of water, 70.0 g of sodium chloride, 1000 g of ice and 0.3 ml of a nonionic wetting agent (nonylphenyl polyethylene glycol ether) there was added slowly 85.0 ml of the copper phthalocyanine trisulfonic acid chloride solution from part A above while maintaining 20° C. by the addition of 345.0 g of ice with vigorous stirring. After stirring for approximately fifteen minutes, 50.0 ml of xylene was slowly added and the agitation continued for fifteen additional minutes before stopping the stirring. The water layer was separated from the bottom and the organic layer containing the dyestuff was washed twice with 1300.0 ml of water, separating after each wash. There was added to the resulting organic layer 75.0 ml of water, 31.6 g of 1-(2-aminoethyl)-2-imidazolidinone, 20.7 g of potassium carbonate and 1.0 ml of pyridine producing a slurry having a pH of 10.3 which was stirred overnight at ambient temperature. In the morning the pH was 9.95. The slurry was sequentially heated at 45° to 50° C. for one hour and at 60° to 65° C. for one and three quarters hours before cooling to room temperature. The solids were collected by filtration, washed with 500.0 ml of one percent aqueous sodium chloride and dried in vacuo at 90° C. to obtain 35.6 g of solids containing as the major component bis-N-{[2-(2-oxo-imidazolidin-1-yl)ethyl]sulfonamido}copper phthalocyanine (Formula IV: m=1 to 3; and n=0 to 1).

C. With stirring, 10.0 g of the product from part B above was added to a mixture of 60.0 ml of water and 35.0 g of concentrated sulfuric acid. The mixture was heated at reflux for approximately sixteen hours, cooled and with stirring poured into 200.0 ml of water. The resulting slurry was made alkaline to Brilliant Yellow test paper by the addition of approximately 45.0 ml of concentrated ammonium hydroxide. After stirring for thirty minutes, an additional 10.0 ml of concentrated ammonium hydroxide was added. The solid was collected by filtration, washed with 200.0 ml of one percent aqueous sodium chloride solution and dried in vacuo at 50° C. to obtain 8.5 g of a blue colored solid being predominantly bis-N-{[N'-(2-aminoethyl)-2-aminoethyl]sulfonamido}copper phthalocyanine (Formula III: y=2; m=1 to 3; and n=0 to 1). The visible absorption spectrum of a dilute acetic acid solution of the dyestuff containing 0.02 g of dye per liter of solution showed a maximum at 625 millimicrons, A=0.7886.

D. A mixture of 20.7 g of predominantly bis-N-{[N'-(2-aminoethyl)-2-aminoethyl]sulfonamido}copper phthalocyanine prepared in a manner similar to that described in part C above, 35.0 ml of water, 22.5 g of glacial acetic acid, 10.8 g of ethylene glycol and 4.7 g of 95 percent methanesulfonic acid was stirred until a deep blue solution resulted. The visible absorption spectrum of a diluted aqueous solution of this dyestuff solution containing 0.12 g of dye per liter of solution showed a maximum at 623 millimicrons, A=1.03. This concentrate, containing approximately 11.5 percent ethylene glycol, approximately 22 percent dye component, approximately 24 percent acetic acid, approximately 4.8 percent methanesulfonic acid and approximately 37.7 percent water each by weight of the entire composition, had a viscosity of 50 centipoises.

The storage-stability of the concentrated dye solution obtained directly above was evaluated by comparing its initial viscosity with that obtained after subjecting the solution to heating in a closed container in a hot-air oven at 120° F. for a period of time. After 472 hours at 120° F., the aged concentrated solution had a viscosity of 75 centipoises.

Sized and unsized paper dyed with aqueous dilutions of this concentrate, according to the procedure described hereinbelow had a turquoise shade and was found to be highly bleachable; approximately 90 percent of the dyestuff was destroyed, in the bleach test described hereinbelow. The dye was also found to produce no bleed in the water-bleed test, the soap-bleed test and the milkbleed test when tested in accord with the procedure described hereinbelow.

E. Substituting propylene glycol for ethylene glycol in part D above, a solution was produced which further diluted to a concentration containing 0.12 g of dye per liter, showed a maximum in the visible absorption spectrum at 624 millimicrons, A=0.996.

F. When diethylene glycol monoethyl ether was substituted for ethylene glycol in part D above, a solution was produced which further diluted to a concentration containing 0.12 g of dye per liter, the visible absorption spectrum showed a maximum at 624 millimicrons, A=0.996.

G. A mixture of 22.0 g of predominantly bis-N-{[N'-(2-aminoethyl)-2-aminoethyl]sulfonamido}copper phthalocyanine prepared in a manner similar to that described in part C above, 54.0 ml of water, 10.8 g of ethylene glycol, 31.4 g of 70 percent glycolic acid and 4.5 g of 98 percent methanesulfonic acid was stirred for approximately eighteen hours at ambient temperature. The visible absorption spectrum of an aqueous solution of this dyestuff containing 0.12 g of dye per liter of solution showed a maximum at 622 millimicrons, A=0.7812. This concentrate containing approximately 18 percent phthalocyanine dyestuff, approximately 25.6 percent glycolic acid, approximately 3.7 percent methanesulfonic acid, approximately 8.7 percent ethylene glycol and approximately 44 percent water, each by weight of the entire composition, had a viscosity of 200 centipoises. The storage stability of the concentrated dye solution obtained above was demonstrated by comparing the initial viscosity, 200 centipoises, with the viscosity, 150 centipoises, of the solution aged for 223 hours in a hot-air oven at 125° F. The concentrate had bleach and bleed properties identical to the concentrate of part D hereinabove.

DYEING PROCEDURE

A. A 0.1 percent stock dye solution was prepared by diluting 2.95 g of the concentrated dye solution containing mixed methanesulfonic acid-acetic acid addition salts of predominantly bis-N-{[N'-(2-aminoethyl)-2-aminoethyl]sulfonamido}copper phthalocyanine prepared in Example 1, part D above to one liter volume with distilled water. With stirring, 30.0 ml of the 0.1 percent dye solution was added to 100.0 g of an aqueous slurry containing approximately 3 percent of bleached kraft pulp (600 Canadian Standard Freeness). Agitation was continued for approximately fifteen minutes prior to dilution with water to a volume of four liters with agitation. The dyed pulp was then formed into an 8 by 8 inch square of paper by means of a filter-box. The paper sheet was pressed between two blotters and then dried at 180° F. for four minutes between two fresh dry blotters to yield a uniformly dyed turquoise paper sheet.

B. Sized Paper Grades

With stirring 30 ml of the 0.1 percent stock dye solution was added to 100 g of an aqueous slurry containing 3 percent of bleached kraft pulp (600 Canadian Standard Freeness). After approximately three minutes of stirring, 5.0 g of a 1.5 percent water solution of papermaker's alum was added. Stirring was continued for approximately fifteen minutes before it was diluted to four liters with water and the pH adjusted to 5.0 with dilute sulfuric acid. The dyed fiber slurry was drawn into an 8 by 8 inch square of paper and dried as described in part A above.

TESTING PROCEDURES

The following test procedures were employed to determine the resistance of the dyestuffs to bleed in moist paper, to bleed from paper in the presence of soap or milk, and to bleaching with hypochlorite bleach.

Water "Bleed" Test

This procedure is a modification of the AATCC Standard Test Method 15-1962, "Colorfastness to Perspiration".

Test pieces consisting of four plies, each one inch square, are cut from the dyed paper to be tested. One or more dyed papers of known dye migration quality are included in the test series as standards.

The absorbent material consists of filter paper having a relatively smooth finish (Whatman #1, 4.25 cm. dia. equivalent). In addition, smooth, flat, glass or clear plastic plates of adequate stiffness, measuring two inches wide and three inches long, are required as separating plates. A 1000 gram weight serves as a dead weight loading.

Four filter paper absorbent pieces are used for each dyed paper test square, two for each side.

The migration test "sandwich" is constructed as follows. A separating plate is placed on a horizontal support and two pieces of the filter paper placed centrally on this plate with the smoother side up. The square dyed paper test pieces, held by tweezers, are immersed in tap water at room temperature for five seconds, drained for five seconds, and immediately centered on the filter paper. Immediately, two pieces of filter paper are centered on the test square and followed at once by another separating plate. This "sandwich" is pressed for a moment with the fingers, after which, without delay, a piece of filter paper is positioned on the top separating plate as before to receive a second test square of wetted dyed paper. The above procedure is then repeated as rapidly as possible and without interruption, stacking one "sandwich" on the other, until all dyed paper test pieces have been put under test.

As soon as a stack is completed, a 1000 gram weight is centered on the top separating plate. The stack is allowed to stand at room temperature (75° F.) for fifteen minutes.

At the end of the migration period, the stack is disassembled, and each dyed paper test square and its filter paper absorbents clipped to a supporting card. A separate card is used for each test square. The dyed paper test squares and filter papers are air dried at room temperature for at least two hours (in the dark) before ranking. Relative degrees of dye migration, as compared to that from standard samples, are determined by visual ratings, in daylight, of the intensity of dye stain on the filter paper surfaces which had been in contact with the test square.

Soap-Bleed Test

This procedure utilizes the same method employed in the Water-Bleed Test described above, except that the dyed paper test squares are immersed in a 0.5 percent tap water solution of white soap flakes (a mixture of 80 percent sodium soap and 20 percent potassium soap produced from 70 percent tallow and 30 percent coconut oil glyceride blend; "Ivory" brand, Proctor and Gamble Co.) at 120° F., instead of water alone.

Milk-Bleed Test

This procedure utilizes the same method employed in the water-bleed test described above, except that the dyed paper squares are immersed in room temperature homogenized milk instead of water.

Bleach Test

This procedure compares the degree to which the color of dyed papers would be discharged in a waste paper recovery operation employing hypochlorite bleach.

A preliminary estimate of bleachability is obtained by placing a drop of hypochlorite bleach, containing 2.5 percent available chlorine, on the dyed paper and allowing it to dry at room temperature. From this test, both rate and degree of bleaching are estimated.

A more accurate test, approximating paper mill procedure, is performed by defibering three grams of dyed paper in 150 ml of distilled water using a kitchen blender. The defibered pulp slurry is placed in a jar and hypochlorite is added to the extent desired, usually 2.5 percent available chlorine based on the weight of the dry fiber. The slurry consisting of pulp and hypochlorite is adjusted to pH 9 with dilute sulfuric acid or dilute aqueous solution of sodium hydroxide and placed in a water bath to maintain the interval in the temperature range of 115° F. to 125° F. After the test is started, the jar is loosely capped. At five minute intervals, the cap is tightened and the jar inverted twice to circulate the liquor. The cap is loosened between inversions. After twenty minutes, the pH is checked, and if higher than 7.5, is adjusted thereto. The test is then continued for an additional twenty minutes (with five minutes between inversions). The terminal pH is generally found to be 6.0–6.5. An excess of sodium thiosulfate is added as an antichlor, mixed for five minutes and the slurry is diluted to a concentration of approximately 0.3 percent of fiber. Sheets are then prepared at pH 7 without a washing step. Finally, this sheet is pressed and dried in a paper dryer. Control dyeings at specific levels can then be made to accurately determine the loss of strength of color on bleaching.

EXAMPLE 2

A. To 20.0 ml of solution from Example 1 part D above, 20.0 ml of isopropyl alcohol was added with stirring, and the solid which separated from solution was collected by filtration and washed with isopropyl alcohol. The filter cake was redissolved in approximately 25 ml of water and isopropyl alcohol was added to precipitate the acid addition salt. The resulting dark blue solid was collected by filtration, washed with isopropyl alcohol and dried in vacuo at 90° C. to obtain 5.7 g of the mixed methanesulfonic acid-acetic acid addition salts of predominantly bis-N-{[N'-(2-aminoethyl)-2-aminoethyl]sulfonamido}copper phthalocyanine. Elemental analysis established that this product has an average per molecule of approximately 1.9 [N'-(2-aminoethyl)-2-aminoethyl]sulfonamido substituents, approximately 0.8 sulfonic acid substituent, approximately 1.9 complexed methanesulfonic acid molecules and approximately 1.9 complexed acetic acid molecules. The visible absorption spectrum of the mixed methanesulfonic acid-acetic acid addition salts of the dyestuff in water containing 0.02 g of dye per liter of solution showed a maximum at 620 millimicrons, A=0.625.

Unsized paper dyed with an aqueous dilution of mixed methanesulfonic acid-acetic acid addition salts of this dyestuff containing 0.1 g of dye per 100.0 ml of solution, according to the procedure described above, had a turquoise shade and was found to be highly bleachable; approximately 97.5 percent of the dyestuff was destroyed, in the bleach test described above. The dye was also found to produce no bleed in the water-bleed test, only a slight bleed in the soap-bleed test and a trace of bleed in the milk-bleed test.

B. With stirring, 5.0 g of the solid product prepared in a manner similar to Example 1, part C above was slowly added to 100.0 ml of distilled water and 30.0 ml of 95 percent methanesulfonic acid was added in 10.0 ml incruments over three hours at 70°–75° C. After cooling, the solution was slowly added to 400.0 ml of isopropyl alcohol to obtain the dark blue solid which was collected by filtration. The filtered solid was dissolved in approximately 60 ml of distilled water and heated in the range of 70°–75° C. for ten minutes. After cooling to ambient temperature, the resulting solution was slowly added to approximately 400 ml of acetone to precipitate the acid addition salts. The resulting dark blue solid was collected by filtration and dried at 50° C. to obtain the methanesulfonic acid addition salts of predominantly bis-N-{[N'-(2-aminoethyl)-2-aminoethyl]sulfonamido} copper phthalocyanine. Elemental analysis established that this product has an average of approximately two [N'-(2-aminoethyl)-2-aminoethyl]sulfonamido substituents, approximately 0.8 sulfonic acid substituent and approximately two complexed methanesulfonic acid molecules. The visible absorption spectrum of dilute methanesulfonic acid addition salt solution containing 0.02 g of dye per liter of solution showed a maximum at 622 millimicrons, $A = 0.648$.

Unsized paper dyed with an aqueous dilution containing 0.1 g per 100 ml of solution of the methanesulfonic acid addition salts of the dyestuff according to the procedure described above had a turquoise shade and was found to be highly bleachable; approximately 97 percent of the dyestuff was destroyed, in the bleach test described above. The dye was also found to produce no bleed in the water-bleed test, only a slight bleed in the soap-bleed test and a trace bleed in the milk-bleed test.

C. With stirring, 12.0 ml of glacial acetic acid was slowly added to 5.0 g of a product prepared in a manner similar to Example 1, part C suspended in 100.0 ml of distilled water. After stirring approximately two hours at 70°–75° C., the resulting solution was cooled and poured into 500.0 ml of isopropyl alcohol. The resultant mixture was heated on a steam bath for approximately ninety minutes, cooled and the dark blue solid was collected by filtration. The resulting wet solid was dissolved in approximately 60 ml of water by heating at 70°–75° C. for one hour. After cooling to ambient temperature, the dark blue solution was added to 400.0 ml of acetone and digested on a steam bath for one hour. An additional 200.0 ml of acetone was added to the mixture and the dark blue solid was collected by filtration and dried in vacuo at 50° C. to obtain the acetic acid addition salts of predominantly bis-N-{[N'-2-aminoethyl)-2-aminoethyl]sulfonamido}copper phthalocyanine. Elemental analysis established that this product has an average per molecule of approximately 1.8 [N'-(2-aminoethyl)-2-aminoethyl]sulfonamido substituents, approximately 0.8 sulfonic acid substituent and approximately one complexed acetic acid molecule. The visible absorption spectrum of the acetic acid addition salts in water containing 0.02 g of dye per liter of solution showed a maximum at 629 millimicrons, $A = 0.690$.

Unsized paper dyed with an aqueous dilution containing 0.1 g per 100.0 ml of the acetic acid addition salts of the dyestuff according to the procedure described above had a turquoise shade and was found to be highly bleachable; approximately 95 percent of the dyestuff was destroyed in the bleach test described above. The dye was also found to produce no bleed in the water-bleed test, only a slight bleed in the soap-bleed test and a trace of bleed in the milk-bleed test.

D. Proceeding in a manner similar to that described in part C above, 5.0 g of a product prepared in a manner similar to Example 1, part C, was interacted with 10.0 ml of 70 percent glycolic acid and poured into 400.0 ml of acetone and the solid collected by filtration. After redissolving the solid in water and adding the solution to acetone, the dark blue solid was isolated by filtration and dried in vacuo at 50° C. to obtain the glycolic acid addition salts of predominantly bis-N-{[N'-(2-aminoethyl)-2-aminoethyl]sulfonamido}copper phthalocyanine. Elemental analysis established that this product has an average per molecule of approximately two [N'-(2-aminoethyl)-2-aminoethyl]sulfonamido substituents, approximately 0.9 sulfonic acid substituent, and approximately two complexed glycolic acid molecules. The visible absorption spectrum of the glycolic acid addition salts in water containing 0.02 g of dye per liter of solution showed a maximum at 620 millimicrons, $A = 0.544$.

Unsized paper dyed with an aqueous dilution containing 0.1 g per 100.0 ml of the glycolic acid addition salts of this dyestuff according to the procedure described above had a turquoise shade and was found to be highly bleachable; approximately 98 percent of the dyestuff was destroyed in the bleach test described above. The dye was also found to produce no bleed in the water-bleed test; a very slight bleed in the soap-bleed test; and only a trace of bleed in the milk-bleed test.

E. With stirring, 25.0 ml of 37 percent aqueous hydrochloric acid was slowly added to a mixture of 5.0 g of a product prepared in a manner similar to that described in Example 1, part C above and 50.0 ml of water. After stirring for approximately two hours, the resulting mixture was allowed to sit at ambient temperature overnight. In the morning the dark blue solid was collected by filtration. The water wet solid was mixed with 110.0 ml of distilled water and 15.0 ml of 37 percent hydrochloric acid. After stirring for approximately ten minutes, 250.0 ml of isopropyl alcohol was added and the resulting mixture was stirred for five additional minutes. The resulting dark blue solid was collected by filtration, washed three times each with 50.0 ml of isopropyl alcohol and dried in vacuo at 60° C. to obtain the hydrochloric acid addition salts of predominantly bis-N-{[N'-(2-aminoethyl)-2-aminoethyl]sulfonamido}copper phthalocyanine. Elemental analysis established that this product has an average per molecule of approximately 2.1 [N'-(2-aminoethyl)-2-aminoethyl]sulfonamido substituents, approximately 0.9 sulfonic acid substituent and approximately 4.2 complexed hydrochloric acid molecules. The visible absorption spectrum of the hydrochloric acid addition salts in water containing 0.02 g of dye per liter of solution showed a maximum at 622 millimicrons, $A = 0.7544$.

Unsized paper dyed with aqueous dilution containing 0.1 g per 100.0 ml of the hydrochloric acid addition salts of this dyestuff according to the procedure described above had a turquoise shade and was found to be highly bleachable; approximately 95 percent of the dyestuff was destroyed in the bleach test described above. The dye was also found to produce no bleed in the water-bleed test, a slight bleed in the soap-bleed test and a trace of bleed in the milk-bleed test.

F. To 5.0 g of a product prepared in a manner similar to that described in Example 1, part C above suspended in 100.0 ml of distilled water, there was added dropwise 12.0 ml of 37 percent hydrochloric acid. The mixture was heated at 60°–70° C. for approximately one hour and then cooled to ambient temperature. The resulting dark blue solid was collected by filtration and washed four times each with 25.0 ml portions of acetone. With stirring, the wet filter cake was dissolved in 50.0 ml of water at 50°–55° C. The solution was cooled to ambient temperature and 60.0 ml of acetone was added. The resulting mixture was added to 500.0 ml of isopropyl alcohol. The dark blue solid which resulted was filtered and dried to obtain the hydrochloric acid addition salts of predominantly bis-N-{[N'-(2-aminoethyl)-2-aminoethyl]sulfonamido}copper phthalocyanine. Elemental analysis established that this product has an average per molecule of approximately 2.1 [N'-(2-aminoethyl)-2-aminoethyl]sulfonamido substituents, approximately 0.7 sulfonic acid substituent and approximately 2.1 complexed hydrochloric acid molecules. The visible absorption spectrum of the hydrochloric acid addition salts in water containing 0.02 g of dye per liter of solution showed a maximum at 620 millimicrons, A=0.702.

EXAMPLE 3

A. A water wet filter cake containing approximately 30.5 g of copper phthalocyanine trisulfonic acid chloride, prepared similar to Example 1, part B above wherein the trisulfonic acid chloride was filtered from the ice water after drowning, was added to 200.0 ml of cold water and the temperature adjusted to 5° C. by the addition of ice. Slowly sodium carbonate was added to the slurry until it was slightly alkaline to Brilliant Yellow test paper and 25.0 g of 3-dimethylaminopropylamine and 1.0 ml of pyridine was added. After stirring overnight at ambient temperature, the slurry was heated at 70°–80° C. for one and one-half hours. The slurry was cooled to room temperature, the solid collected by filtration and washed with 500.0 ml of one percent aqueous sodium chloride solution. After drying in vacuo at 85° C., there was obtained 34.5 g of predominantly bis-N-[(3-dimethylaminopropyl)sulfonamido]copper phthalocyanine (Formula II: $y=3$; $R=CH_3$; $m=1$ to 3; $n=0$ to 1), a blue solid. The visible absorption spectrum of a dilute acetic acid solution of the dyestuff containing 0.02 g of dye per liter of solution showed a maximum at 618 millimicrons, A=0.7646.

Sized and unsized paper dyed with dilutions of this dyestuff in 0.05 percent aqueous acetic acid, according to the procedure described above, had a turquoise shade and was found to be highly bleachable, in the bleach test described above. The dye was also found to produce no bleed in the water-bleed test and to bleed slightly in the soap-bleed test when tested in accord with the procedures described above.

B. A mixture of 4.0 g of a product prepared similar to that described in part A above and 50.0 ml of ethyl cellosolve was heated at reflux temperature for approximately one hour, cooled to ambient temperature and the blue solid was collected by filtration, washed with 50.0 ml of distilled water and dried in vacuo at 50° C. to obtain 0.8 g of a deep blue solid.

This 0.8 g of deep blue solid was suspended in 35.0 ml of distilled water and with stirring 2.0 ml of 95 percent aqueous methanesulfonic acid was slowly added. The resultant mixture was stirred at 50° C. for approximately one hour, cooled to ambient temperature and poured rapidly into 300.0 ml of acetone. The dark blue solid which precipitated was collected by filtration. The wet filter cake was dissolved in 50.0 ml of distilled water with stirring at 70° C. After stirring one hour at 70° C., the resulting solution was cooled to ambient temperature and rapidly poured into 400.0 ml of acetone. The resulting mixture was stirred at 50° C. for approximately one hour, cooled and allowed to stand at ambient temperature overnight. The dark blue solid which formed was collected by filtration and dried at 50° C. in vacuo to obtain the methanesulfonic acid addition salts of predominantly bis-N-[(3-dimethylaminopropyl)sulfonamido]copper phthalocyanine. Elemental analysis established that this product has an average per molecule of approximately 1.85 (3-dimethylaminopropyl)sulfonamido substituents, 0.85 sulfonic acid substituents and one complexed methanesulfonic acid molecule. The visible absorption spectrum on an aqueous solution containing 0.02 g of the methanesulfonic acid addition salts per liter of solution showed a maximum at 618 millimicrons, A=0.628.

C. A mixture of 30.0 g of predominantly bis-N-[(3-dimethylaminopropyl)sulfonamido]copper phthalocyanine prepared in a manner similar to that described above in part A, 40.0 ml of water, 24.0 g of urea and 12.0 ml of 70 percent aqueous glycolic acid was stirred until all the solids were in solution. The resulting solution contained approximately 28.4 percent dye constituent, approximately 7.8 percent glycolic acid, approximately 22.6 percent urea and approximately 41.2 percent water and had a viscosity of 140 centipoises.

Sized and unsized paper dyed with aqueous dilutions of this concentrate, according to the procedure described above, had a turquoise shade and was found to be highly bleachable, in the bleach test described above. The dye was also found to produce no bleed in the water-bleed test and to bleed slightly in the soap-bleed test when tested in accord with the procedure described above.

D. A mixture of 21.0 g of predominantly bis-N-[(3-dimethylaminopropyl)sulfonamido]copper phthalocyanine prepared in a manner similar to that described in Example 3, part A above, 28.0 ml of water, 15.4 g of glacial acetic acid and 8.0 g of ethylene glycol was stirred until a deep blue solution resulted containing the acetic acid addition salts of predominantly bis-N-[(3-dimethylaminopropyl)sulfonamido]copper phthalocyanine. The resulting concentrate contained approximately 24 percent dye constituent, approximately 21.3 percent acetic acid, approximately 11.3 percent ethylene glycol and approximately 38.7 percent water. The visible absorption spectrum of a diluted aqueous solution of the acetic acid addition salts solution containing 0.12 g of dye per liter of solution showed a maximum at 618 millimicrons, A=1.308.

E. Proceeding in a manner similar to that described in Example 2, part A above, 25.0 ml of the solution from Example 3, part C was slowly added to 500.0 ml of isopropyl alcohol. The resulting solid was collected by filtration and redissolved in 25.0 ml of distilled water. The solution was added to 500.0 ml of isopropyl alcohol. The resulting solid was collected by filtration, washed with isopropyl alcohol and dried to obtain 7.5 g of the glycolic acid addition salt of predominantly bis-N-[(3-dimethylaminopropyl)sulfonamido]copper phthalocyanine, a dark blue solid. The visible absorption spectrum of a dilute aqueous solution of the acetic acid addition salt containing 0.02 g of dye per liter of solution showed a maximum at 620 millimicrons, A=0.70.

Unsized paper dyed with aqueous dilutions of the acid addition salts containing 0.10 percent dye, according to the procedure described above had a turquoise shade and was found to be highly bleachable; approximately 95 percent of the dyestuff was destroyed. The dye was also found to produce only a trace of bleed in the water-bleed test.

F. A mixture of 21.0 g of predominantly bis-N-[(3-dimethylaminopropylamino)sulfonamido]copper phthalocyanine prepared in a manner similar to that described in Example 3, part A above, 38.0 ml of water, 10.8 g of ethylene glycol, 21.0 g of glacial acetic acid and 4.5 g of 98 percent methanesulfonic acid was mixed until a deep blue solution resulted. This concentrate contained approximately 22 percent dye constituent, approximately 22 percent acetic acid, approximately 4.7 percent methanesulfonic acid, approximately 11.3 percent ethylene glycol and approximately 40 percent water. The visible absorption spectrum of a diluted aqueous solution of the mixed acetic acid-methanesulfonic acid addition salts solution containing 0.12 g of dye per liter of solution showed a maximum at 619 millimicrons, $A=1.116$.

Unsized paper dyed with an aqueous dilution containing 0.1 g per 100.0 of the mixed acetic acid-methanesulfonic acid addition salts of the dyestuff according to the procedure above, had a turquoise shade and was found to be highly bleachable; approximately 95 percent of the dyestuff was destroyed, in the bleach test described above. The dye was also found to produce a trace of bleed in the water-bleed test.

G. A mixture of 4.0 g of predominantly tris-N-[(3-dimethylaminopropyl)sulfonamido]copper phthalocyanine prepared similar to in part A above, utilizing 25.7 equivalents of chlorosulfonic acid and 5.24 equivalents of thionyl chloride per equivalent of copper phthalocyanine in the preparation of the chlorosulfonated copper phthalocyanine, 100.0 ml of distilled water and 5.0 ml of 70 percent aqueous glycolic acid was heated and stirred until all the solid was dissolved. The resulting solution was slowly poured into 600.0 ml of isopropyl alcohol with stirring. The dark blue solid which separated was collected by filtration, and washed with isopropyl alcohol. The alcohol-wet solid was dissolved in 100.0 ml of distilled water and the resulting solution was slowly added with stirring into 700.0 ml of isopropyl alcohol. The glycolic acid salts of predominantly tris-N-[(3-dimethylaminopropyl)sulfonamido] copper phthalocyanine that had precipitated was collected by filtration, washed with isopropyl alcohol and dried. Elemental analysis established that this product has an average per molecule of approximately 2.85 (3-dimethylaminopropyl)sulfonamido substituents, approximately 0.45 sulfonic acid substituent and approximately 2.4 complexed glycolic acid molecules. The visible absorption spectrum of a dilute aqueous solution containing 0.02 g of the glycolic acid addition salts per liter of solution showed a maximum at 619 millimicrons, $A=0.731$.

Unsized paper dyed with an aqueous dilution containing 0.1 g of the glycolic acid addition salts of the dyestuff per 100.0 ml of solution according to procedure described above had a turquoise shade and was found to be highly bleachable; approximately 95 percent of the dyestuff was destroyed in the bleach test described above. The dyed paper was also found to have a trace of bleed in the water-bleed test.

EXAMPLE 4

A. Proceeding in a manner similar to that described in Example 1, part A above, 17 g of copper phthalocyanine was interacted with thionyl chloride in chlorosulfonic acid. The resulting filter cake was suspended in 85.0 ml of cold water and the temperature adjusted to 15° C. by the addition of ice. Slowly the resulting slurry was neutralized by the addition of potassium carbonate until Brilliant Yellow test paper showed a light pink color.

B. With stirring, 2-methyl-1,4,5,6-tetrahydropyrimidine was prepared in a manner similar to that described in Japanese Pat. No. 15,925 (1967) (Chemical Abstracts 68:39331n) by interacting one equivalent of 1,3-propylenediamine with one equivalent of acetonitrile in the presence of sulfur. A small portion of elemental zinc was added to the reaction mass and there was obtained by distillation at reduced pressure, 14.5 g of 2-methyl-1,4,5,6-tetrahydropyrimidine. The 2-methyl-1,4,5,6-tetrahydropyrimidine was refluxed in water for two hours and cooled to obtain a solution of N-acetyl-1,3-propylenediamine.

C. To the slurry of predominantly copper phthalocyanine trisulfonic acid chloride from part A above was added the solution of N-acetyl-1,3-propylenediamine from part B above, 8.9 g of potassium carbonate and 1.0 ml of pyridine. Initially the pH was 11.2 and after stirring at ambient temperature overnight the pH was 9.4. There was added to the mixture, 10.0 g of potassium carbonate and the mixture was maintained at 55°–60° for approximately five and one-half hours. The resultant solid was collected by filtration, washed four times each with 50.0 ml of one percent aqueous sodium chloride and dried at 60°–65° C. in vacuo to obtain 28.6 g of predominantly bis-N-{[3-(acetylamino)propyl]sulfonamido}copper phthalocyanine.

D. To 400.0 ml of water there were added 25.0 g of the product from part C above and 25.0 ml of concentrated hydrochloric acid. The mixture was heated at reflux for approximately twenty-four hours and cooled. Slowly, 25.0 ml of ammonium hydroxide was added to the mixture to render it alkaline to Brilliant Yellow test paper. The slurry was then heated at 50°–55° C. for approximately two hours, the solid was collected by filtration, washed with 500.0 ml of one percent aqueous sodium chloride solution and dried in vacuo at 45°–50° C. to obtain 23.5 g of predominantly bis-N-[(3-aminopropyl)sulfonamido] copper phthalocyanine as a blue solid. (Formula II: $y=3$; $R=H$; $m=1$ to 3; $n=0$ to 1). The visible absorption spectrum of a dilute acetic acid solution of the dyestuff containing 0.02 g of dye per liter of solution showed a maximum at 624 millimicrons, $A=0.754$.

Sized and unsized paper dyed with dilutions of this dyestuff in 0.05 percent aqueous acetic acid, according to the procedure described above, had a turquoise shade and was found to be 90 percent bleachable, in the bleach test described above. The dye was also found to produce no bleed in the water-bleed test and to bleed only very slightly in both the soap-bleed test and milk-bleed test when tested in accord with the procedures described above.

E. A mixture of 21.1 g of predominantly bis-N-[(3-aminopropyl)sulfonamido] copper phthalocyanine prepared as described in part D above and 100.0 ml ethylene glycol monoethyl ether was heated at reflux for approximately one hour, cooled to ambient temperature. The dark blue solid was collected by filtration, washed with 50.0 ml of distilled water and dried at 50° C. in vacuo.

F. With stirring, 4.0 g of the solid obtained in part E above was suspended in 100.0 ml of distilled water and 5.0 ml of 70 percent aqueous glycolic acid was slowly added. After stirring the resulting mixture for approximately one hour at 50° C., it was cooled to ambient temperature and slowly poured into 600.0 ml of acetone. The solid which separated was collected by filtration. The wet filter cake was suspended in 75.0 ml of water with stirring and heated at 70° C. for approximately one hour. The resulting solution was poured into 500.0 ml of acetone and this solution was then added to 1000.0 ml of isopropyl alcohol. The dark blue solid which formed was collected by filtration and dried at 50° C. in vacuo to obtain 3.0 of the glycolic acid salts of predominantly bis-N-[(3-aminopropyl)sulfonamido] copper phthalocyanine. Elemental analysis established that this product has an average per molecule of approximately 2.2 (3-aminopropyl)sulfonamido substituents, approximately 0.8 sulfonic acid substituent and approximately 1.4 complexed glycolic acid molecules. The visible absorption spectrum of a dilute aqueous solution of the glycolic acid addition salts containing 0.02 g of the acid addition salts per liter of solution showed a maximum at 617 millimicrons, A-0.6408.

Unsized paper dyed with an aqueous dilution containing 0.1 g per 100.0 ml of the glycolic acid addition salts of the dyestuff according to the procedure described above had a turquoise shade. The dye was found to have no bleed in the water-bleed test; a slight bleed in the soap-bleed test; and a trace bleed in the milk-bleed test described above.

G. A mixture of 12.6 g of predominantly bis-N-[(3-aminopropyl)sulfonamido] copper phthalocyanine obtained in part E above, 97.0 ml of water, 6.5 g of ethylene glycol, 12.6 g of glacial acetic acid and 2.7 g of 98 percent methanesulfonic acid was stirred until the solids were dissolved. This concentrate, which contained approximately 9.6 percent dye constituent, approximately 9.6 percent acetic acid, approximately 2 percent methanesulfonic acid, approximately 5 percent ethylene glycol and approximately 73.7 percent water, was added to 500.0 ml of isopropyl alcohol with stirring. The dark blue solid which precipitated was collected by filtration and washed with isopropyl alcohol. The alcohol-wet solid was dissolved in 150.0 ml of distilled water and isopropyl alcohol was added a second time. The dark blue solid was collected by filtration, washed with isopropyl alcohol and dried in vacuo at 90°–95° C. to obtain the mixed acetic acid-methanesulfonic acid addition salts of predominantly bis-N-[(3-aminopropyl)sulfonamido] copper phthalocyanine. Elemental analysis established that this product has an average per molecule of approximately 2.2 (3-aminopropyl) sulfonamido substituents, approximately 0.8 sulfonic acid substituent, approximately one complexed methanesulfonic acid molecule and approximately 1.2 complexed acetic acid molecules. The visible absorption spectrum of a dilute aqueous solution containing 0.02 g of the mixed acetic acid-methanesulfonic acid addition salts per liter of solution showed a maximum at 621 millimicrons, A=0.646.

Unsized paper dyed with an aqueous dilution containing 0.1 g of the mixed acetic acid-methanesulfonic acid addition salts of the dyestuff per 100.0 ml according to the procedure described above had a turquoise shade. The dyed paper was found to have no bleed in the water-bleed test; a slight bleed in the soap-bleed test; and a trace of bleed in the milk-bleed test.

EXAMPLE 5

A. To 200.0 ml of cold water, a water wet filter cake containing approximately 30.5 g of copper phthalocyanine trisulfonic acid chloride was added and the temperature adjusted to 0°–5° C. by the addition of ice. Slowly sodium carbonate was added until the slurry was slightly alkaline to Brilliant Yellow test paper. With stirring 39.7 g of N,N-diethanolpropylenediamine and 1.0 ml of pyridine were added and the resulting mixture was stirred approximately eighteen hours at ambient temperature. The resulting slurry was then heated at 75°–85° C. for approximately one-half hour, cooled to room temperature, the solid collected by filtration and washed with 1000.0 ml of one percent aqueous sodium chloride solution. After drying at 90° C. in vacuo, there was obtained 25.0 g of predominantly bis-N-{[3-(diethanolamino)propylamino]sulfonamido} copper phthalocyanine (Formula II: $y=3$; $R=C_2H_4OH$; $m=1$ to 3; $n=0$ to 1) a blue solid. The visible absorption spectrum of a dilute acetic acid solution of the dyestuff containing 0.02 g of the dye per liter of solution showed a maximum at 614 millimicrons, $A=0.656$.

Sized and unsized paper dyed with dilutions of this dyestuff in 0.05 percent aqueous acetic acid, according to the procedure described above, had a turquoise shade and was found to be highly bleachable, in the bleach test above. The dye was found to produce no bleed in the water bleed test and to bleed slightly in both the soap and milk-bleed tests when tested in accord with the procedure described above.

B. A mixture of 5.0 g of predominantly bis-N-{[3-(diethanolamino)propylamino]sulfonamido} copper phthalocyanine obtained in part A above, 100.0 ml of distilled water and 3.0 ml of 98 percent methanesulfonic acid was stirred with heating until all of the solid was in solution. After cooling to room temperature, the solution was poured with stirring into 400.0 ml of isopropyl alcohol. The blue solid that precipitated was collected by filtration and washed with isopropyl alcohol. The alcohol-wet filter cake was dissolved in 100.0 ml of distilled water with heating and stirring. After cooling to ambient temperature, the solution was poured with stirring into 500.0 ml of isopropyl alcohol. The blue solid that precipitated was collected by filtration, washed with three 100.0 ml portions of isopropyl alcohol, and dried in vacuo at 50°–55° C. to obtain 4.7 g of the methanesulfonic acid addition salts of predominantly bis-N-{[3-(diethanolamino)propylamino]sulfonamido} copper phthalocyanine as a dark blue solid. Elemental analysis established that this product has an average per molecule of approximately 2.2 (3-diethanolaminopropyl)sulfonamido substituents, approximately 0.8 sulfonic acid substituent and approximately 1.4 complexed methanesulfonic acid molecules. The visible absorption spectrum of an aqueous solution of the methanesulfonic acid salts containing 0.02 g of dye per liter of solution showed a maximum at 615 millimicrons, $A=0.627$.

Unsized paper dyed with an aqueous dilution containing 0.1 g per 100.0 ml of the methanesulfonic acid addition salts of the dyestuff according to the procedure above had a turquoise shade and was found to be highly bleachable; approximately 97 percent of the dyestuff was destroyed, in the bleach test described above. The dye was found to produce no bleed in the water-bleed test.

It is contemplated that by following procedures similar to those described in Examples 3 and 4 but employing the appropriate reactive amine intermediates required for interaction with poly(chlorosulfonyl) copper phthalocyanines and further employing the appropriate alkanesulfonic acid, aliphatic or hydroxyaliphatic acid or inorganic acid there will be obtained the poly(substituted sulfonamido) copper phthalocyanine acid addition salts of Formula II, Examples 6-14 presented in Table A hereinbelow:

TABLE A

Poly(N—substituted sulfonamido) copper phthalocyanine acid addition salts

| Example | R | y | m | Acid |
|---|---|---|---|---|
| 6 | $CH_3$ | 3 | 4 | HBr |
| 7 | $C_2H_5$ | 3 | 3 | $C_2H_5SO_3H$ |
| 8 | $n-C_4H_9$ | 3 | 2 | $C_3H_7COOH$ |
| 9 | $CH_3$ | 2 | 5 | $HOC_3H_6COOH$ |
| 10 | $C_2H_5$ | 2 | 4 | $CH_3CHOHCOOH$ |
| 11 | $i-C_3H_7$ | 2 | 3 | $C_2H_5SO_3H$ |
| 12 | $C_2H_5$ | 4 | 2 | $C_3H_7COOH$ |
| 13 | H | 2 | 5 | $HOC_3H_6COOH$ |
| 14 | H | 4 | 3 | HBr |

COMPARATIVE EXAMPLE 1

Proceeding in a manner similar to that described in U.S. Pat. No. 4,111,650, Example 1, a stable concentrated liquid preparation of a paper dye was prepared as follows: a mixture of 100.0 ml of warm water, 9.8 g of 90 percent aqueous formic acid, 10.0 g of benzyl alcohol, 19.0 g of N-methyl-2-pyrrolidinone and 42.3 g of tris-(3-dimethylaminopropylsulfonamido) copper phthalocyanine prepared as described in Example 3, part A hereinabove was stirred approximately twenty-one hours to effect complete solution. The visible absorption spectrum of an aqueous dilution of this concentrate containing 0.12 g of concentrate per liter of solution showed a maximum at 620 millimicrons, A=1.1496. With stirring, 33.5 g of water was added to 169.9 g of the concentrate from above to obtain a solution which was subjected to visible absorption assay. An aqueous dilution of this solution containing 0.12 g of concentrate per liter of solution showed a maximum at 620 millimicrons, A=0.9720.

COMPARATIVE EXAMPLE 2

For purposes of testing the bleed and bleachability properties of papers dyed with the concentrated solution of Comparative Example 1 and the concentrated solutions prepared in a manner similar to that described in Example 1, part D and part G hereinabove, unsized papers dyed with aqueous dilutions of these three concentrates were prepared according to the procedure described hereinabove. All three sets of papers had a turquoise shade. The three sets of dyed papers prepared above were tested in the following bleed tests: water, soap solution, milk, alcoholic beverage, rubbing alcohol, vinegar and detergent solution using the procedure described hereinabove under "Testing Procedures." The alcoholic beverage bleed test, rubbing alcohol bleed test, vinegar bleed test and detergent bleed test all utilize the same method taught in the "Water Bleed Test" described hereinabove except in the alcoholic beverage bleed test a solution consisting of equal volumes of ethyl alcohol and water is used instead of water alone. Similarly a solution of 70 percent isopropyl alcohol—30 percent water replaces water alone; 5 percent acetic acid—95 percent water replaces water alone and a 0.5 percent tap water solution of a synthetic detergent (Igepal® CO-630), nonylphenoxypoly(ethyleneoxyethanol), which is of the type commonly used in liquid detergents of the dishwashing type, replaces the water alone in the rubbing alcohol, vinegar and detergent solution bleed tests respectively. Further, these dyed papers were tested to determine the percent of the color destroyed in the bleachability test described hereinabove in the "Test Procedures." The results of these seven bleed tests and the bleachability test are presented in the following table.

TABLE B

| Test | Paper Dyed With Solution of Example 1, Part D | Paper Dyed With Solution of Example 1, Part G | Paper Dyed With Solution of Comparative Example 1 |
|---|---|---|---|
| Water Bleed | none | none | none |
| Soap Bleed | slight | slight | slight |
| Milk Bleed | slight | slight | moderate |
| Alcoholic Beverage Bleed | none | none | none |
| Isopropanol Bleed | none | none | none |
| Vinegar Bleed | trace | trace | slight |
| Detergent Bleed | none | none | none |
| Color Remaining After Bleaching | 8 percent | 12 percent | 22 percent |

These test results show that in both the milk bleed test and the vinegar bleed test, the concentrated solution of Comparative Example 1 made according to U.S. Pat. No. 4,111,650 had approximately one-hundred percent more bleed than both of the solutions of the instant invention. This can be readily determined when applying the bleed grade definitions given hereinabove to the grading of the bleed reported in Table B. Further, these results show that in the bleach test more of the color in the paper dyed with the dyestuff concentrates of the instant invention is destroyed by the hypochlorite bleach than the color in the paper dyed with the dyestuff concentrate of U.S. Pat. No. 4,111,650. The 22 percent color remaining in the bleached paper that had been dyed with the dyestuff concentrate of the -650 patent represents 275 percent more color than the bleached paper dyed with the dyestuff solution of Example 1, part D of the instant invention and 183 percent more color than the bleached paper dyed with the dyestuff solution of Example 1, part G of the instant invention.

What is claimed is:

1. Acid addition salts of a phthalocyanine of the formula

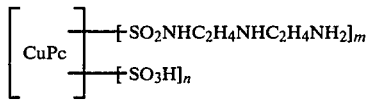

with a single acid or mixed acids wherein: Pc is phthalocyanine, m is a number from one to five, and n is a number from zero to one having a total of at least (0.05 m) but not more than (2 m) complexed molecules of one or more acids selected from the group consisting of hydrochloric acid, hydrobromic acid, acetic acid, propionic acid, glycolic acid, 3-hydroxypropionic acid, lactic acid, methanesulfonic acid and ethanesulfonic acid.

2. Acid addition salts according to claim 1 wherein m is one to three.

3. Acid addition salts according to claim 2 having one to three complexed hydrochloric acid molecules and 0.5 to one sulfonic acid substituent.

4. Acid addition salts according to claim 2 having three to five complexed hydrochloric acid molecules and 0.5 to one sulfonic acid substituent.

5. Acid addition salts according to claim 2 having 0.5 to two complexed acetic acid molecules and 0.5 to one sulfonic acid substituent.

6. Acid addition salts according to claim 2 having one to three complexed glycolic acid molecules and 0.5 to one sulfonic acid substituent.

7. Acid addition salts according to claim 2 having one to four complexed methanesulfonic acid molecules and 0.5 to one sulfonic acid substituent.

8. Mixed acids addition salts according to claim 2 having one to three complexed methanesulfonic acid molecules, 0.5 to three complexed acetic acid molecules and 0.5 to one sulfonic acid substituent.

9. A phthalocyanine of the formula

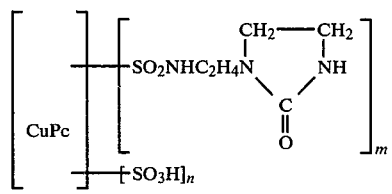

wherein Pc is phthalocyanine, m is a number from one to five and n is a number from zero to one.

10. A phthalocyanine of the formula

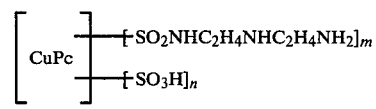

wherein m is a number from one to give and n is a number from zero to one.

* * * * *

UNITED STATES PATENT AND TRADEMARK OFFICE
CERTIFICATE OF CORRECTION

PATENT NO. : 4,448,722

DATED : May 15, 1984

INVENTOR(S) : Nathan N. Crounse

It is certified that error appears in the above-identified patent and that said Letters Patent is hereby corrected as shown below:

Column 12, line 6, "of" (second occurrence) should read -- or --.

Column 12, lines 13-14, "chlorosufonating" should read -- chlorosulfonating --.

Column 30, Claim 10, line 20, "give" should read -- five --.

Signed and Sealed this

Eighth Day of April 1986

[SEAL]

Attest:

DONALD J. QUIGG

Attesting Officer  Commissioner of Patents and Trademarks